United States Patent [19]

Dombrowski

[11] 4,178,580

[45] Dec. 11, 1979

[54] FUEL SAVING SIGNALING APPARATUS FOR A MOTOR VEHICLE

[76] Inventor: Anthony E. Dombrowski, 9903 Broadmoor Dr., Omaha, Nebr. 68114

[21] Appl. No.: 19,504

[22] Filed: Mar. 12, 1979

[51] Int. Cl.² ............................................. G08B 21/00
[52] U.S. Cl. ................................. 340/52 D; 180/271
[58] Field of Search ............ 340/52 D, 52 R, 53, 340/56; 307/10 R; 180/103

[56] References Cited

U.S. PATENT DOCUMENTS

| | | | |
|---|---|---|---|
| 2,729,806 | 1/1956 | Dewhirst | 340/52 D |
| 4,134,101 | 1/1979 | Jones, Jr. | 340/52 D |

Primary Examiner—Alvin H. Waring
Attorney, Agent, or Firm—Zarley, McKee, Thomte, Voorhees & Sease

[57] ABSTRACT

A fuel saving signaling apparatus for a motor vehicle is described including a buzzer and indicator light mounted on the dash of the vehicle. The buzzer and indicator light are operatively connected to a time delay relay which is series connected to a microswitch and the vehicle ignition. The microswitch is normally closed so that current will be supplied to the time delay relay when the vehicle ignition is on so that the buzzer and indicator light will be energized after the vehicle has been idling for a predetermined period of time. The microswitch is positioned adjacent a rotatable element such as the vehicle speedometer cable or the like whereby rotation of the speedometer cable, as the vehicle is being driven, will cause the microswitch to be moved from its closed position to its open position thereby preventing as the vehicle is brought to a halt, the microswitch closes soon as the vehicle is brought to a halt, the microswitch closes and the time delay is activated so that the indicator light and buzzer will be energized after the predetermined period of time has elapsed. A second time delay relay is also provided and is connected to the first time delay relay and is adapted to energized the vehicle horn after a predetermined length of time has elapsed after the signal light and buzzer have been energized.

7 Claims, 3 Drawing Figures

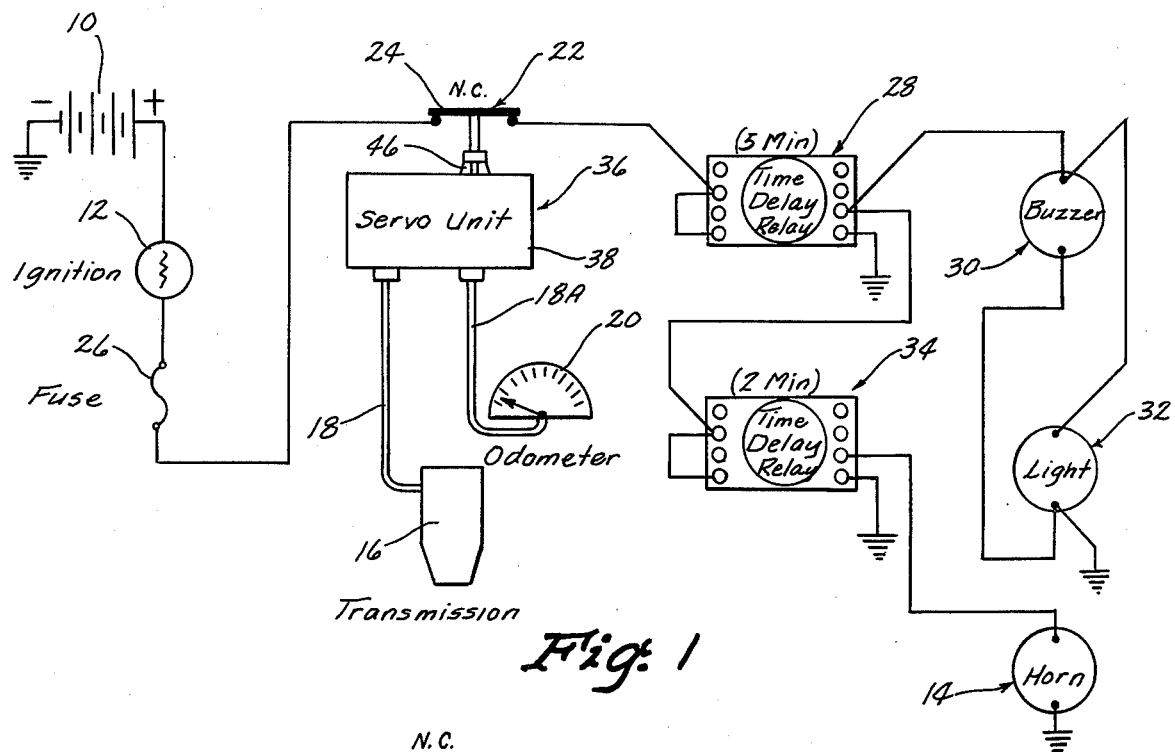
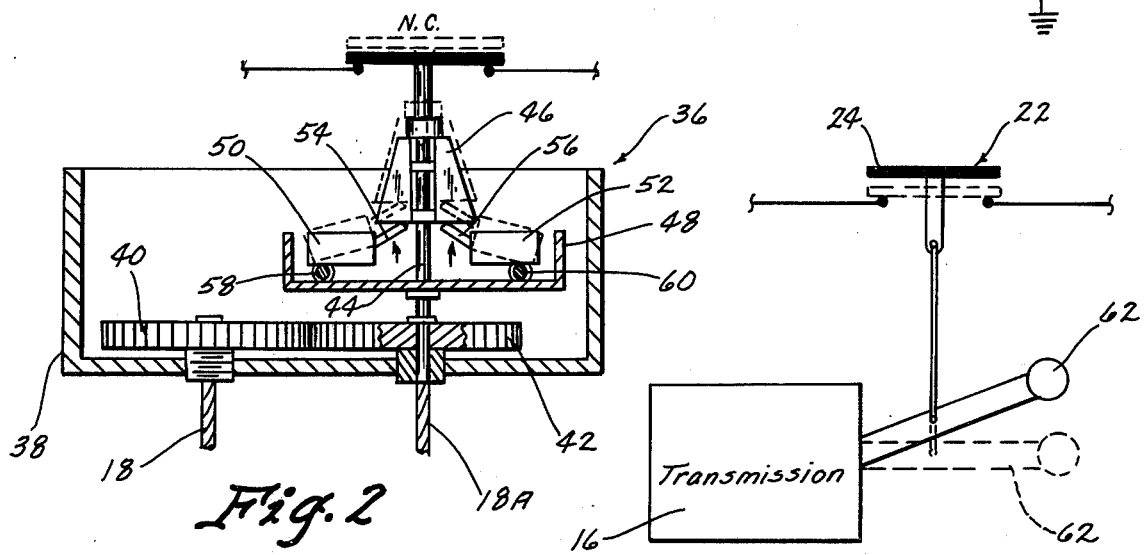

FUEL SAVING SIGNALING APPARATUS FOR A MOTOR VEHICLE

BACKGROUND OF THE INVENTION

This invention relates to a fuel saving signaling apparatus for a motor vehicle and more particularly to an improved and simplified fuel saving signaling apparatus for a motor vehicle.

A great deal of fuel is consumed by a motor vehicle if it is permitted to idle for a period of time. Estimates of the amounts of fuel consumed by an idling engine range from 0.6 to 1.3 gallons per hour. Thus, if a driver of a vehicle allows the vehicle to idle for any number of reasons, the vehicle is consuming and wasting much needed fuel and energy.

The objectionable motor vehicle idling problem is very prevalent in the construction industry. For example, it has been noted that heavy equipment operators tend to leave their vehicles running for very long periods of time while attending to other tasks or waiting for other construction operations to be completed.

Attempts have been made to provide devices which will alert the motor vehicle operator that the vehicle has been idling for an objectionable period of time but the previous devices are extremely complicated and are not easily adaptable to motor vehicles. For example, U.S. Pat. No. 2,652,125 illustrates an engine stopping device for a motor vehicle but the device depends upon the movement of a pendulum-like apparatus to prevent the system from being activated. It is believed that the pendulum-like device in U.S. Pat. No. 2,652,125 will be inadvertently energized, thereby preventing the signaling equipment from operating by vibrations caused by the vehicle idling. A second prior art device is disclosed in U.S. Pat. No. 2,729,826 but that device relies upon the oil pressure in the vehicle engine. The oil pressure of a motor vehicle engine will vary considerably depending upon the atmospheric temperature, oil temperature, idling speed, etc. and it is believed that such devices are not practical or desirable for the application of conserving fuel.

Therefore, it is a principal object of the invention to provide an improved fuel saving signaling apparatus for a motor vehicle.

A further object of the invention is to provide a fuel saving signaling apparatus for a motor vehicle which energizes a buzzer and a light on the vehicle dash prior to activating the vehicle horn.

A further object of the invention is to provide a fuel saving signaling apparatus for a motor vehicle which is easily adaptable to the motor vehicle without extensive modification thereof.

A further object of the invention is to provide a fuel saving signaling apparatus for a motor vehicle which cannot be circumvented by the vehicle operator.

A further object of the invention is to provide a fuel saving signaling apparatus for a motor vehicle which will help conserve valuable fuel.

A further object of the invention is to provide a fuel saving signaling apparatus for a motor vehicle which is economical of manufacture and durable in use.

These and other objects will be apparent to those skilled in the art.

BRIEF DESCRIPTION OF THE DRAWINGS

FIG. 1 is a schematic view of the circuitry of this invention:

FIG. 2 is a fragmentary sectional view of the means for opening the microswitch; and FIG. 3 is a schematic view of an alternate method of activating the microswitch portion of the invention.

DESCRIPTION OF THE PREFERRED EMBODIMENT

The signaling apparatus of this invention is designed to be attached to a motor vehicle (not shown) including a conventional battery 10, ignition 12 and horn 14. Some motor vehicles such as bucket loaders or the like may not have a horn mounted thereon but it is recommended that a suitable horn 14 be mounted thereon which may be heard over the din of the equipment noise. The numeral 16 refers to the transmission of the vehicle having a speedometer cable 18 extending therefrom in conventional fashion. The numeral 20 refers to the speedometer (odometer) in the vehicle which is normally connected to the speedometer cable 18.

The numeral 22 refers to a conventional microswitch which is normally closed and which includes a switch arm 24 normally held in the closed position by a suitable spring or the like. Microswitch 22 is series connected to fuse 26 and ignition 12.

Microswitch 22 is series connected to a conventional adjustable time delay relay 28. In this particular embodiment, time delay relay 28 is set to function after a five minute period of time has elapsed. Relay 28 is connected to buzzer 30 and indicator light 32 which are provided on the dash of the vehicle. Thus, buzzer 30 and light 32 will be energized five minutes after current has been supplied to relay 28 providing the current has been continuously supplied to the relay 28. Relay 28 is electrically connected to a conventional adjustable time delay relay 34 which is adapted to energize or activate the horn 14 through the electrical connection provided therebetween. Preferably, time delay relay 34 is set to activate the horn 14 two minutes after current is supplied to the relay 34.

The numeral 36 refers to the apparatus which is operatively connected to the speedometer cable 18 to open the switch 22 when the vehicle is being driven. Apparatus 36 includes a housing 38 having a pair of gears 40 and 42 rotatably mounted therein which are in mesh with each other and which have identical specifications. Gear 40 is operatively connected to speedometer cable 18 for rotation therewith. Gear 42 is operatively connected to speedometer cable 18A which is connected to the speedometer 20 in conventional fashion so that the speed of the vehicle will be indicated on the speedometer 20. Shaft 44 is secured to gear 42 and extends upwardly therefrom. A vertically movable collar or sleeve means 46 is mounted on the upper end of the shaft 44 and is adapted to engage the switch arm 24 to open the same when the sleeve 46 has been moved to its uppermost position. Support 48 is secured to shaft 44 for rotation therewith and has a pair of members 50 and 52 pivotally mounted about horizontal axes included therein. Members 50 and 52 have arms 54 and 56 extending therefrom which are adapted to engage the sleeve 46, upon rotation of the shaft 44, to raise sleeve 46 to its uppermost position. The centrifugal force of the rotating support 48 causes the members 50 and 52 to pivot about their horizontal pivot points 58 and 60 respectively.

The normal mode of operation is as follows. Ignition switch 12 energizes the system when turned on and de-energizes the system when off. With the engine running and the vehicle stopped, the microswitch 22 is in the closed position thereby allowing current to flow to the time delay relay 28. Time delay relay 28 preferably has a five minute delay, and after this period of time, the warning light 30 and buzzer 32 are energized thereby alerting the driver that the vehicle has been idling for an objectionable period of time and alerting the driver that he should turn off the vehicle engine. In the event that the driver or operator is not in the vehicle, the time delay relay 34 activates the horn 14 two minutes after the light 30 and buzzer 32 have been activated. The activation of horn 14 alerts the driver should he be away from the vehicle.

The warning light 30, buzzer 32 and horn 14 are deactivated by turning off the vehicle ignition or by putting the vehicle into motion. The warning light 30 and buzzer 32 are prevented from being initially energized upon the driver placing the vehicle in motion prior to the five minute period of time having elapsed. As previously stated, the motion of the vehicle prevents the system from being energized since the rotation of speedometer cable 18 will cause the switch arm 24 to be moved to its open position thereby preventing current from being supplied to the relays.

A modified form of the invention is illustrated in FIG. 3 and is designed to be used on those vehicles which do not have rotating elements such as speedometer cables, tachometer cables, etc. In the embodiment of FIG. 3, the microswitch 22 is normally closed when the vehicle transmission shift lever 62 is in the neutral position but is open when the shift lever has been moved to one of the forward or reverse gears.

Thus it can be seen that a novel fuel saving signaling apparatus has been provided for a motor vehicle which alerts the motor vehicle operator that his vehicle has been idling for an objectionable period of time. The vehicle operator can only deactivate the signaling means by either turning off the engine or by placing the vehicle in motion. The signaling apparatus of this invention will encourage the operators to turn off the vehicle engine thereby conserving precious fuel. The apparatus disclosed herein may be easily mounted on motor vehicles without extensive modification thereof. The apparatus disclosed herein is relatively trouble free and will be dependable in operation.

Thus it can be seen that the invention accomplishes at least all its stated objectives.

I claim:

1. A fuel saving signaling apparatus for a motor vehicle including an ignition system, a source of electrical energy, a motor and a rotatable means which is rotated when the vehicle is driven, comprising,
   a normally closed switch means operatively electrically connected to the ignition system and source of electrical energy,
   a signaling means,
   a first electrical time delay means series connected to said switch means and said signaling means and imposed therebetween,
   said first time delay means energizing said signaling means after a predetermined period of time has elapsed after said first time delay means has been energized by said switch means,
   said switch means being positioned adjacent said rotatable means and being operatively connected thereto so that said rotatable means will cause said switch means to move from its closed position to its open position when said vehicle is being driven thereby preventing the energization of said signaling means while said vehicle is being driven but permitting said switch means to move to its closed position when the movement of the vehicle has been halted thereby energizing said first time delay means so that the signaling means will be energized when the motor vehicle has been idling for a predetermined length of time.

2. The apparatus of claim 1 wherein said signaling means comprises a visual signal means and an audio signal means.

3. The apparatus of claim 2 wherein said vehicle also has a horn mounted thereon and wherein a second time delay means is electrically connected to said horn and said first time delay means for energizing said horn after a predetermined length of time has passed after said visual and audio signal means have been actuated.

4. The apparatus of claim 3 wherein said first and second time delay means each comprise a time delay relay.

5. The apparatus of claim 1 wherein said rotatable means comprises a speedometer cable.

6. The apparatus of claim 1 wherein said switch means comprises a microswitch including a switch arm, said rotatable means comprising a speedometer cable, and means operatively connected to said speedometer cable which engages said switch arm, to move said microswitch to its open position, when said speedometer cable is being rotated.

7. A fuel saving signaling apparatus for a motor vehicle including an ignition system, a source of electrical energy, a transmission and a shift lever operatively connected to said transmission; said shift lever being movable between neutral, forward and reverse gears, comprising,
   a normally closed switch means operatively electrically connected to the ignition system and source of electrical energy,
   a signaling means,
   a first electrical time delay means series connected to said switch means and said signaling means and imposed therebetween,
   said first time delay means energizing said signaling means after a predetermined period of time has elapsed after said first time delay means has been energized by said switch means,
   said switch means being positioned adjacent said shift lever so that said shift lever will cause said switch means to move from its closed position to its open position when said shift lever is moved from its said neutral gear to either said forward or reverse gears thereby preventing the energization of said signaling means while said shift lever is in forward or reverse gears but permitting said switch means to move to its closed position when said shift lever is in its neutral position so that the signaling means will be energized when the motor vehicle has been idling in said neutral gear for a predetermined length of time.

* * * * *